United States Patent
Schwanitz et al.

(10) Patent No.: US 11,866,266 B2
(45) Date of Patent: Jan. 9, 2024

(54) DEVICE FOR PIVOTALLY SUPPORTING A RETURN ROLLER OF A BELT CONVEYOR DEVICE, AND BELT CONVEYOR DEVICE HAVING SUCH DEVICE

(71) Applicant: Mettler-Toledo Garvens GmbH, Giesen (DE)

(72) Inventors: Florian Schwanitz, Eime (DE); Mario Meyer, Langenhagen (DE); Gerrit Wittenbrink, Hildesheim (DE)

(73) Assignee: Mettler-Toledo Garvens GmbH, Giesen (DE)

( * ) Notice: Subject to any disclaimer, the term of this patent is extended or adjusted under 35 U.S.C. 154(b) by 0 days.

(21) Appl. No.: 17/793,702

(22) PCT Filed: Jan. 18, 2021

(86) PCT No.: PCT/EP2021/050895
§ 371 (c)(1),
(2) Date: Jul. 19, 2022

(87) PCT Pub. No.: WO2021/148339
PCT Pub. Date: Jul. 29, 2021

(65) Prior Publication Data
US 2023/0068674 A1    Mar. 2, 2023

(30) Foreign Application Priority Data
Jan. 24, 2020 (DE) .......................... 102020000460.1

(51) Int. Cl.
*B65G 23/44* (2006.01)
*B65G 1/127* (2006.01)
*B65G 45/00* (2006.01)

(52) U.S. Cl.
CPC ............. *B65G 23/44* (2013.01); *B65G 1/127* (2013.01); *B65G 45/00* (2013.01); *B65G 2207/30* (2013.01)

(58) Field of Classification Search
CPC .... B65G 2207/30; B65G 1/127; B65G 23/24; B65G 45/00
(Continued)

(56) References Cited

U.S. PATENT DOCUMENTS

| 4,561,538 A | 12/1985 | Zwiebel |
| 6,509,533 B1 | 1/2003 | Tanaka et al. |

(Continued)

FOREIGN PATENT DOCUMENTS

| CN | 106586456 A | 4/2017 |
| CN | 206927142 U | 1/2018 |

(Continued)

*Primary Examiner* — James R Bidwell
(74) *Attorney, Agent, or Firm* — Standley Law Group LLP; Jeffrey S. Standley; Adam J. Smith (57) ABSTRACT

A return roller is pivotally supported in a frame-fixed articulation region (20, 21) of a belt conveyor device having a transport belt. A pivot arm (30, 31) extends in a running direction (L) of the transport belt, orthogonal to a longitudinal axis (12) of the return roller, supporting it about the longitudinal axis. A pivot element (40) is spaced apart from the return roller in the running direction. A pivot bearing (22, 23) is arranged on the articulation region for mounting the pivot element for a pivoting movement of the pivot arm around a pivot axis between an operating position and an nonoperating position of the return roller. A bearing surface (24, 25), in a section perpendicular to the pivot axis, is formed as an open arc, with an opening (26, 27) having a center angle ($\varphi$) of less than 180°.

14 Claims, 6 Drawing Sheets

(58) Field of Classification Search
USPC .................................................. 198/813, 814
See application file for complete search history.

(56) References Cited

U.S. PATENT DOCUMENTS

| | | | |
|---|---|---|---|
| 7,549,531 B2 | 6/2009 | Hosch et al. | |
| 9,546,045 B2 * | 1/2017 | Franzaroli | ............ B65G 41/001 |
| 2009/0078543 A1 * | 3/2009 | Shoji | ...................... B65G 21/10 |
| | | | 198/813 |
| 2017/0362034 A1 * | 12/2017 | DeGroot | ................ B65G 47/66 |

FOREIGN PATENT DOCUMENTS

| | | | |
|---|---|---|---|
| DE | G 9213678.8 U1 | 2/1993 | |
| EP | 2910501 | * 8/2015 | ............ B65G 39/16 |
| EP | 3539908 | * 9/2019 | ............ B65G 21/06 |
| JP | 2005179017 | * 7/2005 | ............ B65G 21/06 |
| JP | 2010-37073 A | 2/2010 | |
| KR | 10-2005-0038299 A | 4/2005 | |
| WO | 2006/094417 A1 | 9/2006 | |

* cited by examiner

(Prior Art)

DEVICE FOR PIVOTALLY SUPPORTING A RETURN ROLLER OF A BELT CONVEYOR DEVICE, AND BELT CONVEYOR DEVICE HAVING SUCH DEVICE

TECHNICAL FIELD

The invention relates to a device for the pivotable support of a return roller, which has a longitudinal axis, of a circulating transport belt on a frame-fixed articulation region of a belt conveyor device having a pivot arm extending from the return roller in a running direction of the transport belt orthogonal to the longitudinal axis, on which pivot arm the return roller is rotatably supported about its longitudinal axis and which has a pivot element spaced apart from the return roller in the running direction, a pivot bearing arranged on the articulation region for mounting the pivot element for a pivot movement of the pivot arm about a pivot axis parallel to the longitudinal axis of the return roller between an operating position and a nonoperating position of the return roller, and a belt conveyor device having such a device.

PRIOR ART

Belt conveyor devices are used to transport objects from one location to another. They have numerous fields of application, for example, in the food industry, where they may also have a weighing function. Generally, a belt conveyor device has a drive unit with a driven return roller and a deflection unit with a freely running return roller, which are arranged at opposite ends of a frame in a direction of travel of a transport belt of the belt conveyor device. The transport belt circulates around the driven return roller and the free-running return roller and is tensioned between these two rollers.

Maintenance work on the belt conveyor device, for example, cleaning or replacing elements, may require removal of the transport belt or the rollers. For this purpose, solutions have already been proposed in the prior art.

EP 1 101 715 A1 discloses a belt conveyor device in which a drive unit and a driven return roller are separable from one another by pivoting the drive unit and the driven return roller is thus detachable from a frame. However, the pivoting mechanism is complicated in design.

In the belt conveyor device disclosed in JP 2010-37073 A, a return roller is supported in a bearing, which is pivotable in the direction of the longitudinal axis. A pivoting movement of the bearing allows the return roller to be inserted and removed. However, an additional tensioning mechanism is required to tension the transport belt.

KR 2005 0038299 A discloses a belt conveyor device in which the axes of the return roller are mounted in L-shaped guides and are fixable there by means of screws. The screws also allow adjustment of the belt tension of the transport belt. However, releasing the return roller from the guides requires the use of a tool and is labor intensive.

In contrast, in CN 106586456 A, the roller axes of rollers of a belt conveyor device are mounted in angled slots of a carrier. The roller axles can be inserted into and removed from the slots without the use of a tool. However, with this arrangement there is a risk that the rollers will inadvertently come loose from the slots.

To adjust the belt tension of a transport belt, WO 2006 094417 A1 discloses a tensioning device for a transport belt of a belt conveyor device having a tensioning roller which is pivotable between a position in which it tensions the transport belt and a position in which it relaxes the transport belt. The tensioning roller is not detachable from the belt conveyor device without tools. In addition, this tensioning mechanism requires additional parts, which complicates the structure of the belt conveyor device.

Figure 9:
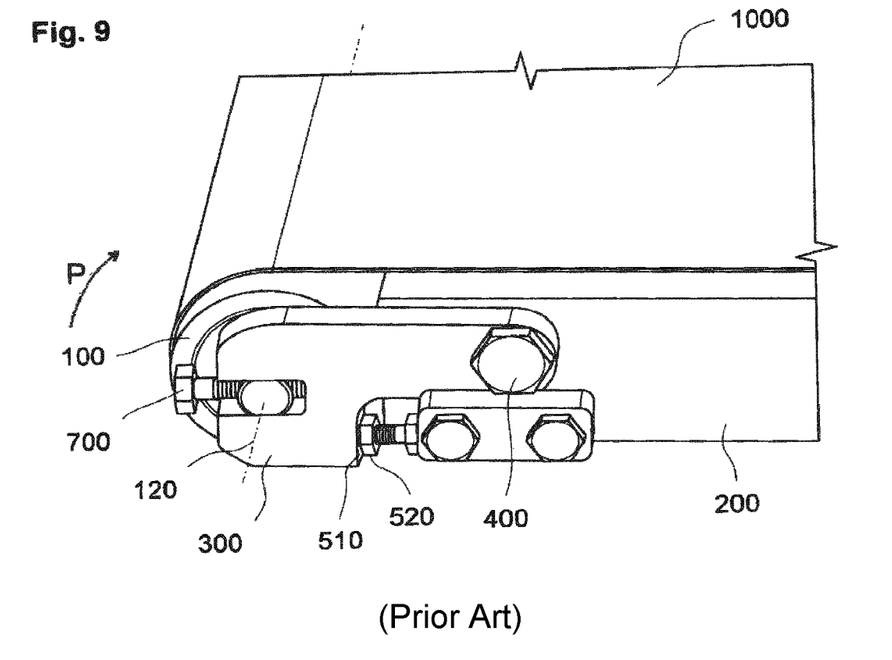
FIG. 9 shows a perspective view of a device for supporting a return roller of the prior art.

A further solution from the prior art, in which an additional tensioning roller can be dispensed with, is shown in FIG. 9. The figure shows a perspective view of a region of a belt conveyor device having the return roller 100. The return roller 100 is pivotably supported on a frame of a belt conveyor device. The return roller 100 is rotatably fastened around its longitudinal axis 120 on pivot arms arranged on both sides of the return roller 100, wherein only one of the two pivot arms 300 is visible in FIG. 9. The pivot arms 300 are each fastened by means of a pivot element 400 on a frame-fixed region 200 of the frame. In the representation shown in FIG. 9, the return roller 100 is arranged in its operating position. A stop 510 arranged on the pivot arm 300 and a counter stop 520 arranged on the frame fix the operating position of the return roller 100. The pivot arm 300 can be pivoted to the right in the direction of the arrow P shown in the figure. As a result, a transport belt 1000 circulating around the return roller 100 is relaxed and can be removed from the belt conveyor device. In addition, the transport belt 1000 can be re-tensioned by turning a screw 700. However, this requires the use of a tool. Also, detaching the pivot arms 300 from the belt conveyor requires the use of a tool.

None of the solutions listed above therefore enables easy detachment of the return roller and the transport belt while at the same time securely supporting the return roller in the operating state.

BRIEF DESCRIPTION OF THE INVENTION

In view of the above-mentioned problems in the prior art, the invention is therefore based on the object of providing a device which enables both the return roller to be securely supported on a belt conveyor device and the return roller and the transport belt to be easily removed from the belt conveyor device.

According to the invention, this object is achieved with a device of the type mentioned at the outset in that the pivot bearing has a bearing surface which, in a section perpendicular to the pivot axis, is in the form of an open arc, the opening of which appears at a center angle of less than 180°, and a sliding body is formed on the pivot element, which is rotatably guided fixed on the frame on the bearing surface in a pivoting position region containing the operating position and which can be passed through the opening in the nonoperating position.

According to the invention, the bearing surface supports the sliding body in a rotationally movable but translationally fixed manner in the pivot position range. Only in the pivot position of the nonoperating position, which is outside of this pivot position range, can the sliding body be passed through the opening translationally. In contrast, the sliding body is formed rotationally-fixed with respect to the pivot arm.

Since the opening of the arc of the pivot bearing appears at a center angle of less than 180°, the arcuate section of the bearing surface extends over an angular range of more than 180° and encloses the sliding body over this angular range in the pivot position range. The sliding body can therefore not be guided through the opening in the pivot position range, in particular in the operating position of the return roller. In the operating position, the return roller is therefore securely fixed on the articulation region and cannot be removed from the belt conveyor device.

If the return roller is pivoted from the operating position into the nonoperating position, the sliding body can be passed through the opening. The return roller can thus be removed from the belt conveyor device.

In addition, pivoting the return roller out of the operating position causes a relaxation of a transport belt circulating around the return roller. The transport belt can then be pulled off the return roller and removed from the belt conveyor device.

According to the invention, the transport belt can be attached to and removed from the belt conveyor device and the return roller can be attached to and removed from the belt conveyor device without using a tool.

The frame-fixed articulation region can be integrally formed with a frame of the belt conveyor device. Alternatively, the frame-fixed articulation region can be fastenable on a frame of the belt conveyor device.

The pivot bearing can be formed as a recess open in the direction of the pivot axis. Alternatively, the pivot bearing can be closed at an end region in the direction of the pivot axis.

In one embodiment of the invention, a passage channel for the sliding body can be formed in the articulation region, extending from the opening to a free outlet. As a result, the sliding body can be held even more securely in the pivot bearing in the pivot position range. In the nonoperating position, the sliding body can be passed through the passage channel. Starting from the opening, the passage channel can extend in a direction that is inclined at an acute angle toward the return roller in relation to an orthogonal straight line connecting the longitudinal axis of the return roller and the pivot axis of the pivot element. This improves the secure holding of the sliding body in the pivot bearing still further.

In one embodiment of the invention, the pivot arm can have a first and a second pivot arm, which are arranged on both sides of the return roller. Furthermore, the pivot element can have a first sliding body assigned to the first pivot arm and a second sliding body assigned to the second pivot arm. The pivot bearing can have a first pivot bearing accommodating the first sliding body and a second pivot accommodating the second sliding body. The first and the second pivot arm can be mirror-symmetrical with respect to a center plane extending perpendicularly to the longitudinal axis. Likewise, the first and the second sliding body and/or the first and the second pivot bearing can be mirror-symmetrical with respect to the center plane.

Furthermore, the pivot element can have a supporting axis extending between the pivot arms, at whose axial end regions the first and the second sliding body are arranged and whose center axis forms the pivot axis.

In a further embodiment of the invention, the device can have a locking device for fixing the pivot arm in the operating position. The locking device can have, for example, a stop arranged on the pivot arm and a counter stop arranged on the frame-fixed articulation region. In the operating position of the return roller, the stop and the counter stop press against one another. Since a torque can be exerted on the return roller due to belt tension of a transport belt circulating around the return roller, the pivot arm can be fixed in the operating position by the locking device.

The stop and/or the counter stop can be adjustable. For example, the stop and/or the counter stop can be designed as a set screw. By adjusting the stop and/or the counter stop, the operating position can be adjusted. As a result, the belt tension of a transport belt circulating around the return roller can also be adjusted.

In a further possible embodiment of the invention, the cross section of the sliding body can be given in a section perpendicular to the pivot axis by two arcs having the same radius that have a common center point and two chords connecting the respective nearest ends of different arcs, wherein the center angles of the two arcs are smaller in each case than the center angle at which the opening appears. The geometric shape of such a sliding body can also be described as follows: In a section perpendicular to the pivot axis, the cross section of the sliding body is formed by a circle from which two circle segments have been cut off. The two cut edges do not have to be parallel, but they cannot intersect within the circle. The two chords can be parallel to each other and of equal length, but they do not have to be. The radius of the arcs corresponds to the radius of the bearing surface. In the pivot position range, the arcuate surfaces of the sliding body are guided in a rotatable manner fixed on the frame on the arcuate section of the bearing surface of the pivot bearing. In the nonoperating position, one of the two arcs of the sliding body is arranged opposite to the opening of the pivot bearing. Since the center angles of the arcs of the sliding body are smaller than the center angle at which the opening appears, the sliding body can be passed through the opening.

In a further embodiment of the invention, the pivot arm can be axially fixed. For example, the pivot element can have a diameter in a region adjoining the sliding body that is larger than the diameter of the arcuate bearing surface. If the pivot bearing is formed as a recess open in the direction of the pivot axis, the pivot element can have a diameter in two regions, which are arranged on both sides of the sliding body in the direction of the longitudinal axis, which is larger than the diameter of the arcuate bearing surface.

The belt conveyor device described at the outset can be part of a larger conveyor system. For example, the belt conveyor device can be part of a weighing system. In this case, a balanced return roller is preferably used. On the other hand, unbalanced rollers are used for supply devices that do not have a weighing function. In such a case, it is desirable for the device according to the invention to be provided with a poka-yoke principle, which prevents the installation of an unbalanced roller in the belt conveyor device of the weighing system.

For this purpose, an association of return roller and frame-fixed articulation region can be encoded by two mutually complementary engagement parts, one of which is arranged on the pivot element and the other on the frame-fixed articulation region, and wherein the two engagement parts engage with one another in an installed position. If an attempt is now made to support a return roller not intended for a specific articulation region on this articulation region, the engagement part attached to the return roller cannot be brought into engagement with the engagement part attached to the articulation region. This can prevent the sliding body from being fully inserted into the pivot bearing and thus from reaching the installation position. It is thus clearly recognizable to a user that the return roller selected by him/her is not to be mounted on the intended frame-fixed articulation region.

For example, one of the engagement parts can be formed as a concave recess and the other engagement part can be formed as a convex projection. In the case that the pivot element has a support axle whose center axis is the pivot axis, the recess may be formed in the support axle and can be circumferential in the azimuthal direction. The projection can be arranged on the frame-fixed articulation region. Two concave recesses circumferential in the azimuthal direction can also be provided on the support axle, which are arranged asymmetrically with respect to an axial center of the support axle. That is, one of the recesses is arranged closer to the axial center than the other recess. With regard to the pivot arm, there are thus two distinguishable installation positions of the support axle. Two projections can then be provided on the frame-fixed articulation region, which are engaged with the recesses in a first installation position of the support axle and wherein the recesses cannot be brought into engagement with the projections in a second installation position of the support axle, due to which reaching the installation position and completely inserting the support axle into the pivot bearing are prevented. This makes it possible, for example, to make balanced and unbalanced return rollers distinguishable by selecting a different installation position for the support axle for the balanced roller than for the unbalanced return roller.

The invention also relates to a belt conveyor device having a transport belt and a device for supporting a return roller according to one of the above-mentioned embodiments. The transport belt can be elastic. The device according to the invention allows the transport belt to be tensioned when the return roller is in the operating position and relaxed when it is in the nonoperating position.

BRIEF DESCRIPTION OF THE FIGURES OF THE DRAWING

In the following description the invention is explained by way of example with reference to the drawing. In the figures

DESCRIPTION OF THE EMBODIMENTS

Figures 1, 2:
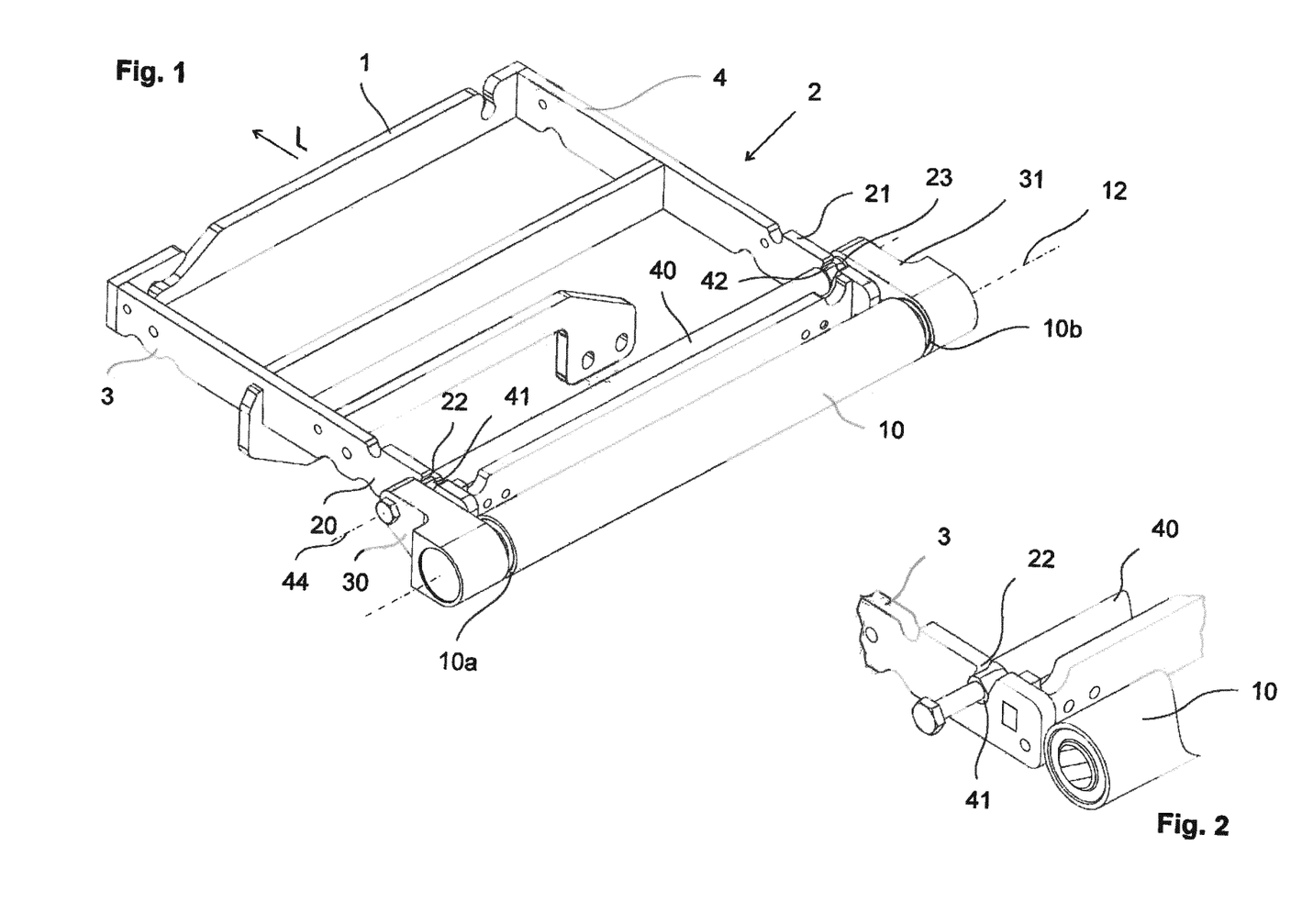
FIG. 1 shows a perspective view of a device according to the invention attached to a framework of a frame, in which the return roller is arranged in the operating position.
FIG. 2 shows a region of the device shown in FIG. 1 without the first pivot arm.

FIG. 1 shows a perspective view of a device according to the invention attached to a frame 1 of a frame 2 of a belt conveyor device, in which a return roller 10 is arranged in the operating position. The framework 1 of the frame 2 has a first side arm 3 and a second side arm 4, which extend in a direction of travel L of a transport belt (not shown). A frame-fixed articulation region having a first region 20 and a second region 21 is formed on the frame 2. The first region 20 integrally formed with the first side arm 3 and the second region 21 is integrally formed with the second side arm 4. A first pivot bearing 22 is arranged on the first region 20. A second pivot bearing 23 is arranged on the second region 21.

At its axial ends 10a, 10b, the return roller 10 is rotatably supported about its longitudinal axis 12 on two pivot arms (first pivot arm 30 and second pivot arm 31) extending in the direction of travel L.

Spaced apart from the return roller 10 in the running direction L, a pivot element designed as a support axle 40 is arranged perpendicular to the running direction L. The support axle 40 is connected to the first and the second pivot arms 30, 31. The center axis of the support shaft 40 forms a pivot axis 44 for the pivoting movement of the first and second pivot arms 30, 31. A first and a second sliding body 41, 42 are arranged at the axial ends of the support axle 44. In FIG. 1, the first sliding body 41 is inserted into the first pivot bearing 22 and the second sliding body 42 is inserted into the second pivot bearing 23. The first and second sliding bodies 41, 42 are rotatably supported in the first and second pivot bearings 22, 23, respectively. This allows the return roller 10 to be pivoted around the pivot axis 44.

In the embodiment shown in FIG. 1, the first and the second pivot bearing 22, 23 are mirror-symmetrical with respect to a center plane extending perpendicularly to the pivot axis 44. With respect to this center plane, the first pivot arm 30 is mirror-symmetrical to the second pivot arm 31, and the first sliding body 41 is mirror-symmetrical to the second sliding body 42. Therefore, only the first pivot bearing 22 and the first sliding body 41 will be described in the following description.

Figure 4:
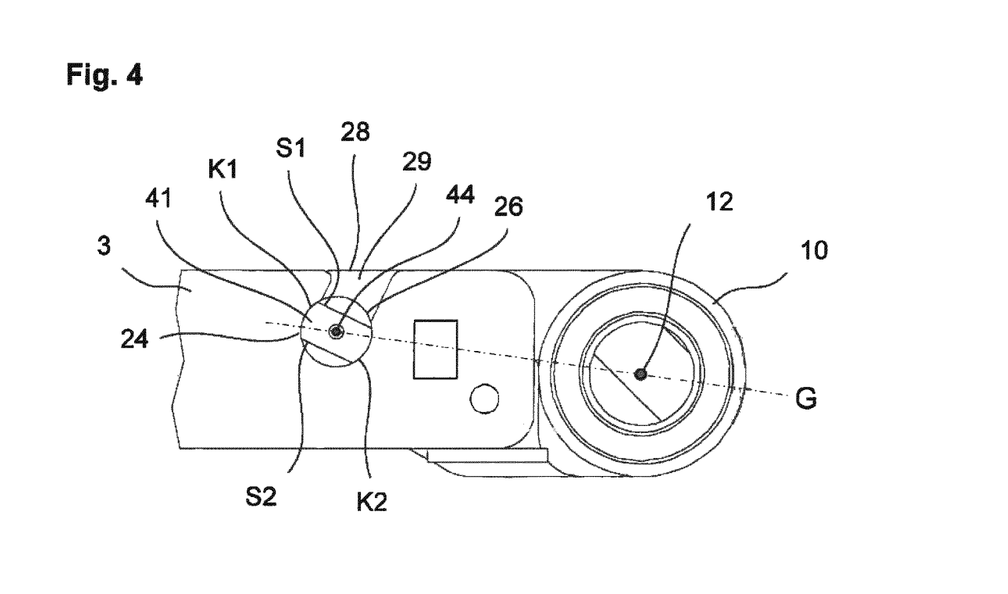
FIG. 4 shows a view of a region of the device shown in FIG. 1 in the direction of the pivot axis without the first pivot arm.
Figure 4A:
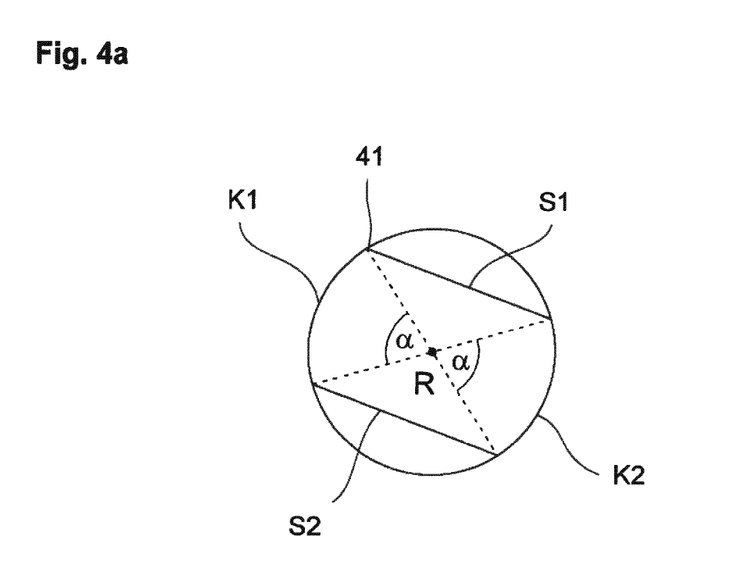
FIG. 4a shows a side view of the sliding body from FIG. 4.
Figure 4B:
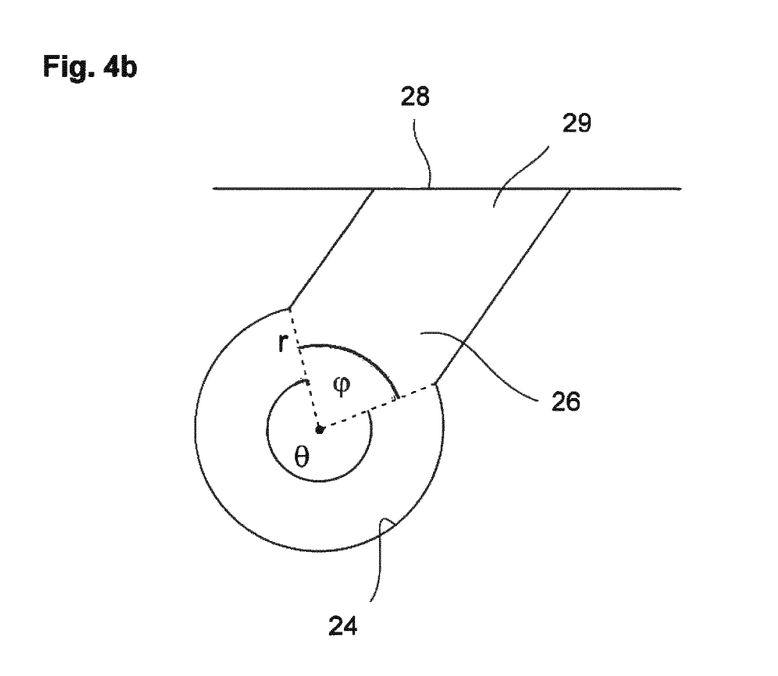
FIG. 4b shows a schematic side view of a region containing the bearing from FIG. 4.

FIGS. 2 and 4 show a perspective view and a view of a region of the device shown in FIG. 1 without the first pivot arm 30 in the direction of the pivot axis 44. FIG. 4a shows an enlarged view of the sliding body 41 from FIG. 4, and FIG. 4b schematically shows the bearing surface 24 from FIG. 4. The shape of the first pivot bearing 22 and the shape of the first sliding body 41 can be seen particularly clearly in the figures. The cross section of the first sliding body 41 is given in a section perpendicular to the pivot axis 44 by two arcs K1, K2 having the same radius R having a common center and two chords S1, S2 connecting the respective nearest ends of different arcs K1, K2 (see also FIG. 4a).

The bearing surface 24 of the first pivot bearing 22 is formed in a section perpendicular to the pivot axis 44 in the shape of an open arc whose opening 26 appears at a center angle of $\varphi < 180°$ (see FIG. 4b). The arcuate bearing surface 24 thus has a center angle $\theta > 180°$. The radius r of the arcuate bearing surface 24 corresponds to the radius R of the arcs K1, K2. The arcs K1, K2 each have a center angle $\alpha$ which is smaller than the center angle $\varphi$ at which the first opening 26 appears, $\alpha < \varphi$. The bearing surface 24 encloses the first sliding body 41 in such a way that the bearing surface 24 supports the sliding body 41 in a pivot position range containing the operating position of the return roller 10 in a rotationally movable but translationally fixed manner. The first sliding body 41 thus cannot be passed through the opening 26 in the pivot position range. Thus, in the pivot position range, the support axle 40 is fixed on the pivot bearings 22, 23 and cannot be removed from the pivot bearings 22, 23.

Due to the condition that the center angle α of the arcs K1, K2 is smaller than the center angle φ of the opening, the first sliding body 41 can be passed translationally through the opening 26 in the pivot position of the nonoperating position which is outside the pivot position range. In this nonoperating position, either the first arc K1 or the second arc K2 of the first sliding body 41 is arranged opposite to the first opening 26. In the embodiment shown in FIGS. 1 to 4, a passage channel 29 extends from the opening 26 to a free outlet 28. The passage 29 extends, starting from the opening 26, in a direction that is inclined toward the return roller 10 at an acute angle in relation to an orthogonal straight line G connecting the longitudinal axis 12 of the return roller 10 and the pivot axis 44 of the support axle 40. The passage channel 29 is dimensioned in such a way that the first sliding body 41 can be guided through it. The statements above also apply to the second pivot bearing 23 and the second sliding body 42. In the nonoperating position, the support axle 40 can be removed through the openings 26, 27. Thus, the return roller 10 can be removed from the frame 2 of the belt conveyor device.

Figure 3:
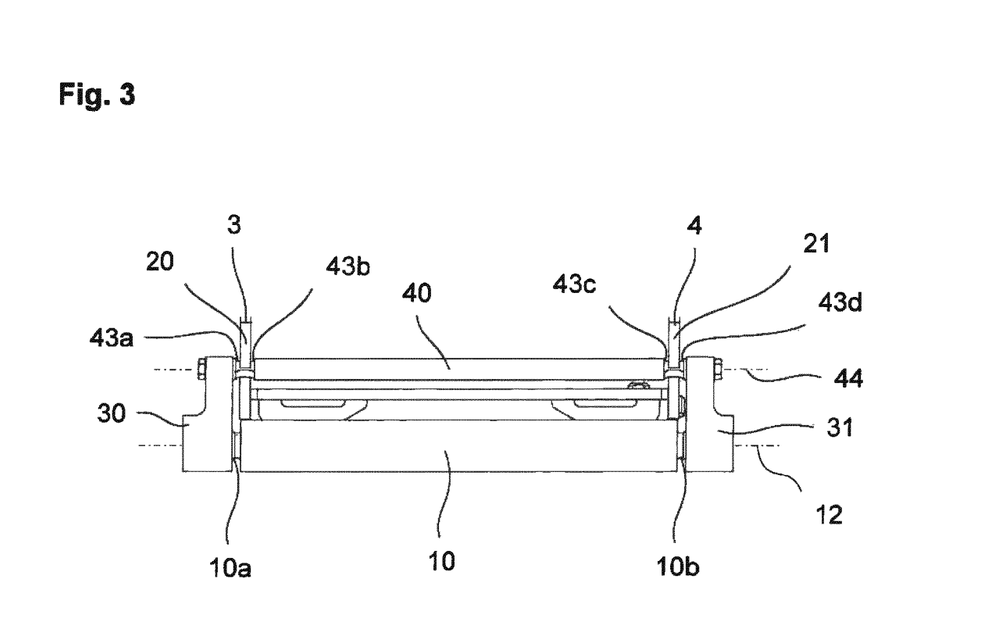
FIG. 3 shows a view of the device shown in FIG. 1 from above.

In a device according to the invention, the pivot arm can be axially fixed. For this purpose, as shown in FIG. 3, the support axle 40 can have a radius in contact regions 43a, 43b adjacent to the first sliding body 41 and/or in contact regions 43c, 43d adjacent to the second sliding body 42 which is greater than the radius r of the first and second bearing surfaces 24, 25. A movement of the support axle 40 in the direction of the pivot axis 44 is thereby prevented.

Figure 5:
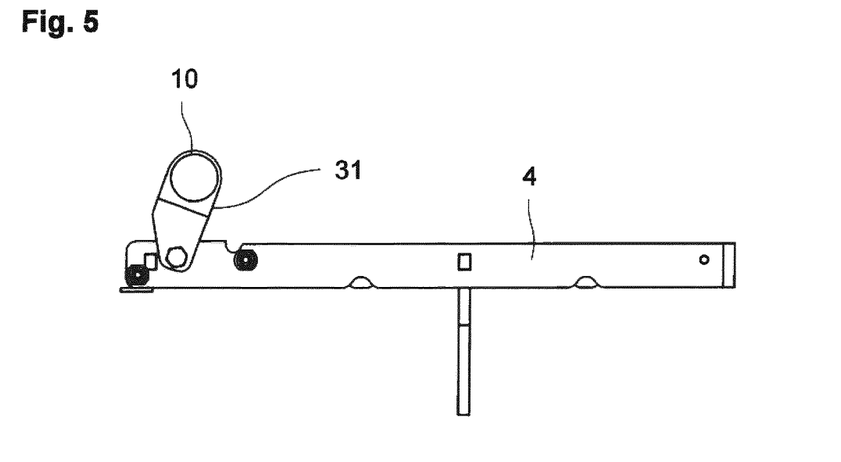
FIG. 5 shows a view of the device shown in FIG. 1 in the direction of the pivot axis, in which the return roller is pivoted out of the operating position.

FIG. 5 shows a view of the device shown in FIG. 1 in the direction of the pivot axis 44, in which the return roller 10 is pivoted out of the operating position. The position shown in FIG. 5 allows the attachment of a transport belt (not shown) circulating around the return roller 10 without the return roller 10 having to be removed from the frame 2. It is also apparent from FIG. 5 that pivoting the return roller 10 into the operating position causes the transport belt to be tensioned.

Figure 6:
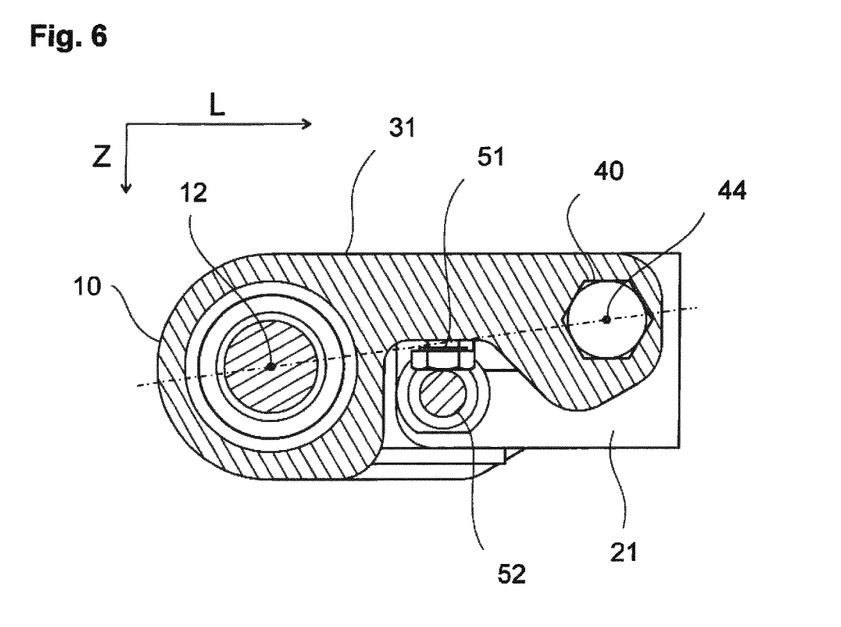
FIG. 6 shows a locking device of an embodiment of the device according to the invention in a section perpendicular to the pivot axis.

FIG. 6 shows a view of a device according to the invention having a locking device, by which the operating position of the return roller 10 is fixed, in a section perpendicular to the pivot axis 44. As shown in FIG. 6, the longitudinal axis 12 of the return roller 10 lies in the direction of gravity Z below the pivot axis 44. When a transport belt circulates around the return roller 10, the transport belt exerts a tensile force on the return roller 10, which is parallel to the running direction L. A torque thus acts on the return roller 10. In order to keep the return roller 10 in its operating position, a locking device is provided on the device. This locking device has a stop 51 provided on the second pivot arm 31 and a counter stop 52 arranged on the frame-fixed articulation region (second region 21). In the locking device shown in FIG. 6, the counter stop 52 is formed as a pin 52 extending in the direction of the longitudinal axis 12. The stop 51 arranged on the second pivot arm 31 is formed as a screw. The screw is an adjustable element which can be screwed further into or out of the second swing arm 31. The operating position of the return roller 10 can thus be adjusted. The locking device can additionally have a stop provided on the first pivot arm 30 and a counter stop provided on the first region 20. The stop can be formed as a screw and the counter stop can be formed as a pin. However, the locking device is not limited to the embodiment shown in FIG. 6. It is thus also conceivable that the counter stop is an adjustable element and the stop is fixed. Alternatively, both the stop and the counter stop can be designed as adjustable elements.

Figure 7:
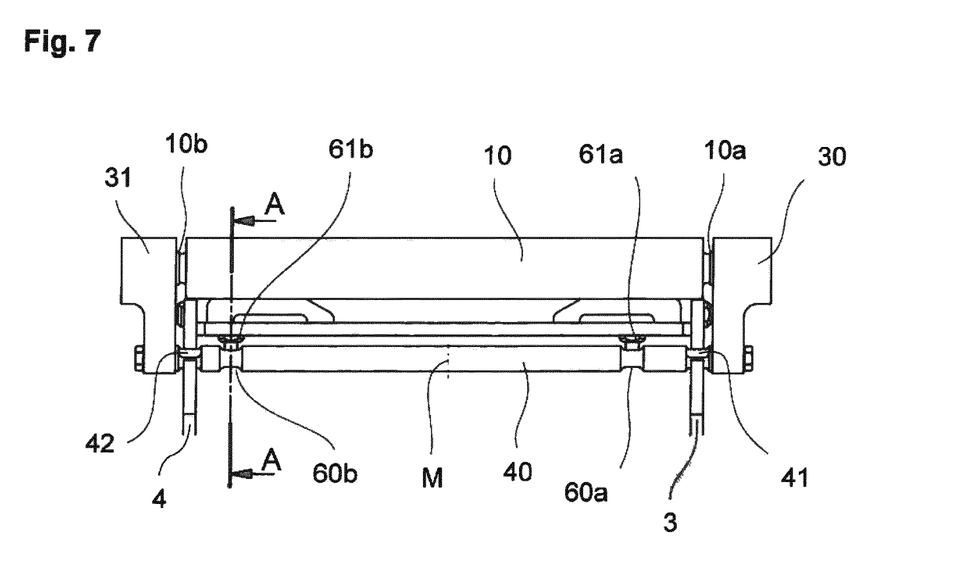
FIG. 7 shows a view from above of a further embodiment of a device according to the invention attached to a framework of a frame having engagement parts encoding the association of return roller and frame-fixed articulation region.
Figure 8:
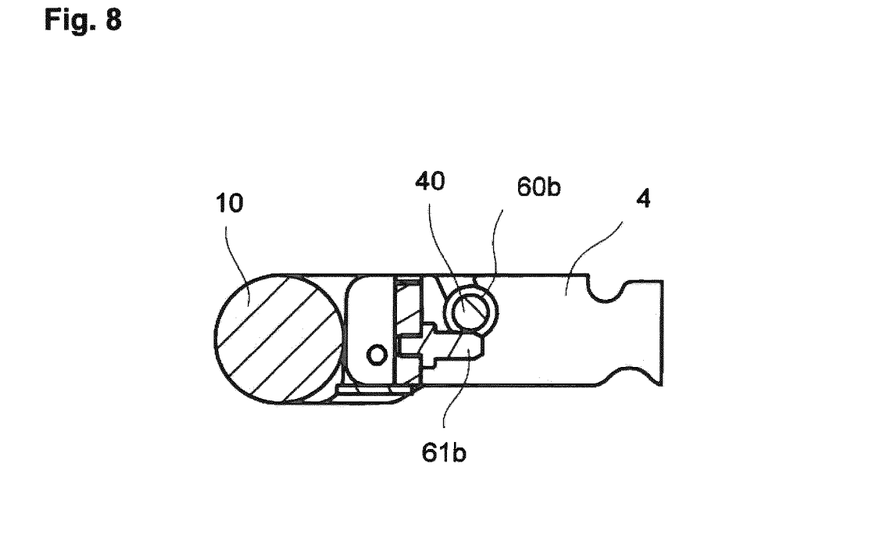
FIG. 8 shows a section along line A-A in FIG. 7.

FIG. 7 is a view of another embodiment of a device according to the invention attached to a framework of a frame 2. The device shown in FIG. 7 has all the elements of the device shown in FIGS. 1 to 6. In addition, the device shown in FIG. 7 has engagement parts 60a, 60b, 61a, 61b coding for the association of return roller 10 and frame-fixed articulation region 20, 21. In the embodiment shown in FIG. 7, the support axle 40 has for this purpose two concave recesses 60a, 60b as a first engagement part, which are circumferential around the support axle 40 azimuthally. Complementary to this, a frame-fixed region of the frame 5 has two convex projections 61a, 61b as the second engagement part. In the installed position shown in FIGS. 7 and 8, the projections 61a, 61b are engaged with the recesses 60a, 60b. As can be seen in FIG. 7, the recesses 60a, 60b are arranged asymmetrically with respect to the axial center M of the support axle 40. Thus, the recess 60b is farther away from the axial center M than the recess 60a. FIGS. 7 and 8 show that a support axle 40 can only be fully inserted into the pivot bearings 22, 23 when the recesses 60a, 60b and the projections 61a, 61b are complementary. Otherwise, when the support axle 40 is inserted through the first and second openings 26, 27 into the first and second pivot bearings 22, 23, a region of the support axle 40 other than the recesses 60a, 60b strikes against the projections 61a, 61b and thus prevents complete insertion into the first and second pivot bearing 22, 23. The recesses 60a, 60b and the projections 61a, 61b thus implement a poka-yoke principle.

LIST OF REFERENCE SIGNS 1 framework
2 frame
3 first side arm
4 second side arm
10 return roller
10a, 10b axial ends
12 longitudinal axis
20 first region
21 second region
22 first pivot bearing
23 second pivot bearing
24 first bearing surface
25 second bearing surface
26 first opening
27 second opening
28 free outlet
29 passage channel
30 first pivot arm
31 second pivot arm
40 support axle
41 first sliding body
42 second sliding body
43a, 43b, 43c, 43d contact region
44 pivot axis
50 locking device
51 stop
52 counter stop
60a, 60b recess
61a, 61b projection
K1 first arc
K2 second arc
S1 first chord
S2 second chord
R radius of the first and second arcs K1, K2
L running direction
G connecting straight line θ center angle of the arcs K1, K2
φ center angle at which the openings 26, 27 appear
a center angle of the arc of the bearing surfaces 24, 25
r radius of the arc of the first and second bearing surfaces 24, 25
P Arrow
M axial center of the support axle 40

The invention claimed is:

1. A device for pivotably supporting a return roller in a frame-fixed articulation region of a belt conveyor having a transport belt that circulates over the return roller in a running direction (L), the device comprising:
 a pivot arm that extends in the running direction, which is orthogonal to a longitudinal axis of the return roller, the pivot arm rotatably supporting the return roller about the longitudinal axis;
 a pivot element of the pivot arm that is spaced apart from the return roller in the running direction;
 a pivot bearing, arranged on the articulation region for mounting the pivot element, allowing a pivoting movement of the pivot arm between an operating position of the return roller and a nonoperating position of the return roller, about a pivot axis that is parallel to the longitudinal axis, wherein the pivot bearing has a bearing surface in the form of an open arc, in a section perpendicular to the pivot axis, an opening of which appears at a center angle (φ) of less than 180°;
 a sliding body, formed on the pivot element, which, in a pivot position range containing the operating position, is rotatably guided on the bearing surface while fixed on the articulation region and which can be passed through the opening in the nonoperating position; and
 a passage channel for the sliding body extending from the opening to a free outlet that is formed in the articulation region.

2. The device according to claim 1, wherein the passage channel, starting from the opening, extends in a direction that is inclined at an acute angle toward the return roller, relative to an orthogonal straight line (G) connecting the longitudinal axis of the return roller and the pivot axis of the pivot element.

3. The device according to claim 1, wherein:
 the pivot arm has a first pivot arm and a second pivot arm which are arranged on both sides of the return roller;
 the pivot element has a first sliding body assigned to the first pivot arm and a second sliding body assigned to the second pivot arm; and
 the pivot bearing has a first pivot bearing accommodating the first sliding body and a second pivot bearing accommodating the second sliding body.

4. The device according to claim 3, wherein the pivot element has a supporting axis extending between the pivot arms, at the axial end regions of which the first and second sliding bodies are arranged, and the center axis of which forms the pivot axis.

5. The device according to claim 1, further comprising: a locking device for fixing the pivot arm in the operating position.

6. The device according to claim 5, wherein the locking device has a stop arranged on the pivot arm and a counter stop arranged on the frame-fixed articulation region.

7. The device according to claim 6, wherein at least one of the stop and the counter stop is adjustable.

8. The device according to claim 1, wherein:
 the sliding body has a cross section defined by a section perpendicular to the pivot axis by two arcs (K1, K2) having a common center point and equal radius (R) and two chords (S1, S2) that connect the respective closest ends of different arcs (K1, K2) to one another,
 wherein a center angle (a) of the two arcs (K1, K2) is smaller in each case than the center angle (φ) at which the opening appears.

9. The device according to claim 8, in which the chords are parallel to one another and of equal length.

10. The device according to claim 1, wherein the pivot arm is axially fixed.

11. The device according to claim 1, wherein:
 an association of the return roller and the frame-fixed articulation region is encoded by two mutually complementary engagement parts, a first of which is arranged on the pivot element and a second of which is arranged on the frame-fixed articulation region the two engagement parts engaged with one another in an installed position.

12. The device according to claim 11, wherein one of the engagement parts is formed as a concave recess and the other engagement part is formed as a convex projection.

13. A belt conveyor device, comprising:
 a transport belt; and
 a device for supporting a return roller according to claim 1.

14. The belt transport device according to claim 13, wherein the transport belt is elastic.

* * * * *

UNITED STATES PATENT AND TRADEMARK OFFICE
CERTIFICATE OF CORRECTION

PATENT NO. : 11,866,266 B2
APPLICATION NO. : 17/793702
DATED : January 9, 2024
INVENTOR(S) : Schwanitz et al.

It is certified that error appears in the above-identified patent and that said Letters Patent is hereby corrected as shown below:

In the Claims

In Column 10, Line 23, Claim 8, please delete "(a)" and insert -- ($\alpha$) --.

Signed and Sealed this
Fifth Day of March, 2024

Katherine Kelly Vidal
*Director of the United States Patent and Trademark Office*